United States Patent [19]
Rezendes

[11] 4,172,464
[45] Oct. 30, 1979

[54] VIBRATION RESISTANT FLAPPER AND NOZZLE

[75] Inventor: Paul W. Rezendes, New Bedford, Mass.

[73] Assignee: The Foxboro Company, Foxboro, Mass.

[21] Appl. No.: 860,028

[22] Filed: Dec. 12, 1977

[51] Int. Cl.[2] .................... G05D 16/00
[52] U.S. Cl. .................... 137/82; 137/85; 251/80
[58] Field of Search .................... 137/82, 85, 84, 86; 251/80

[56] References Cited

U.S. PATENT DOCUMENTS

| | | | |
|---|---|---|---|
| 2,980,076 | 4/1961 | Machlan | 137/82 X |
| 3,083,722 | 4/1963 | Dalder | 137/82 |
| 3,861,411 | 1/1975 | Mitchell | 137/82 |

*Primary Examiner*—Alan Cohan
*Attorney, Agent, or Firm*—Andrew T. Karnakis

[57] ABSTRACT

A pneumatic control instrument includes a nozzle-flapper system having improved dynamic response characteristics under vibrational conditions. A light-mass, compliant flapper having a high natural frequency covers the nozzle and serves to cushion the impact of the nozzle striking the flapper by moving at the same amplitude of vibration as the nozzle so as to precisely track the nozzle over a wide range of vibrational frequencies and amplitudes.

5 Claims, 4 Drawing Figures

VIBRATION RESISTANT FLAPPER AND NOZZLE

FIELD OF THE INVENTION

This invention relates to pneumatic instruments and particularly to nozzle-flapper units commonly employed in such instruments. More particularly, this invention relates to a nozzle-flapper system having improved dynamic response characteristics when subjected to vibrational effects, especially external vibrations.

BACKGROUND OF THE INVENTION

Throughout the pneumatic art, nozzles and co-operating flappers are utilized to generate an output pressure that is proportional to an applied input. Because these nozzle-flapper units form a delicate balanceable assembly whose operating region involves relative motions between flapper and nozzle of less than 0.001 inches, and because of the varying resonant frequencies of the other instrument components that co-operate with the nozzle and flapper, problems with vibrations can arise under certain applications producing resultant instrument output errors.

In the past, considerable effort has been directed towards minimizing these vibration-induced errors by means of damping or otherwise. For example, one method is to build an instrument in which the resonant frequencies of the functionally interrelated components are well above the excitation vibrational frequencies. In this manner, the effects of vibration are effectively reduced. However, owing to design limitations in being able to select components of low mass and high spring rate while still providing useful output under various applications, such an approach is not practical.

Other prior art attempts have involved the use of tuned mechanical structures, instrument isolation mounts, counterbalance and viscous damping means to diminish the effects of vibration. Such additional structure increases the overall complexity of the instrument and hence its manufacturing expense.

U.S. Pat. No. 3,275,238 discloses using a filter for the input air supply to the nozzle by selecting a length of tubing that is one-quarter wave length the resonant frequency of the condition responsive member. In such a manner, resonant vibrations travel down the tubing and are reflected back to the nozzle 180° out of phase with the resonant vibration, thereby resulting in reciprocal cancellation of both vibration waves. In U.S. Pat. No. 3,426,970, there is proposed the creation of a "cushion of air" between the flapper and the nozzle by designing a nozzle structure with two surfaces having a fixed dimensional relationship to the position of the flapper.

While both of the aforementioned patents are primarily concerned with vibrational problems, they propose solutions which are only effective in reducing self-induced vibrations resulting from the fluid dynamics of the nozzle air blast impinging on the flapper, and which are almost totally ineffective in diminishing the effects of external vibrations imposed on the instrument. Thus, it is apparent that the need exists for a simple, inexpensive structure used in conjunction with a nozzle-flapper system that is capable of withstanding the adverse effects of externally induced vibrations.

SUMMARY OF THE INVENTION

The present invention provides a new and improved apparatus for reducing vibrational effects imposed on a pneumatic instrument by employing compliant means associated with the nozzle-flapper system that cushions the impact of displacements induced by the vibrations. In a preferred embodiment to be described in detail below, a light mass, high resonant frequency compliant flapper is arranged to co-operate with a pneumatic nozzle such that the compliant flapper precisely tracks the nozzle over a wide range of vibrational frequencies and amplitudes.

PREFERRED EMBODIMENT

A description of the presently preferred form of the invention is set forth below.

DRAWINGS

DESCRIPTION

Figure 1:
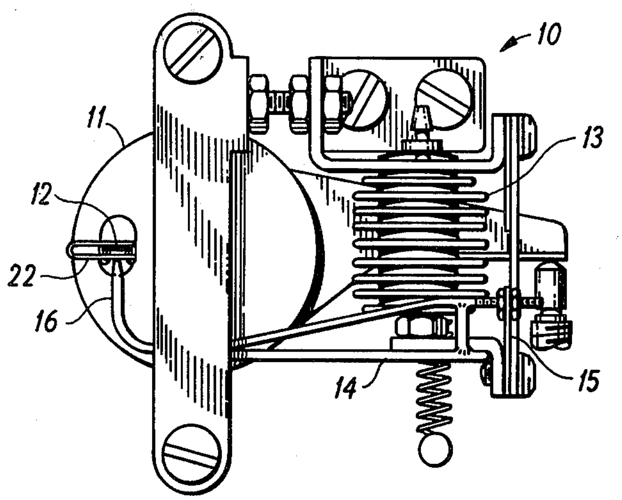
FIG. 1 is an end elevation view of an electro-pneumatic current-to-position instrument embodying the present invention with the instrument casing removed.

Turning now to the drawings, FIG. 1 shows an electro-pneumatic current-to-position instrument 10 whose functional operation is identical to that of the instrument disclosed in copending application Ser. No. 776,575, filed by E. O. Olson et al on Mar. 11, 1977. That copending application describes the instrument in detail, and thus the following description will refer only to those elements required for an understanding of the present invention. Reference should be made to the above-mentioned copending application for specific information concerning further aspects of the device.

The instrument of FIG. 1 must be capable of reliable and accurate performance even in extremely adverse industrial process control environments, especially severe vibrational distrubances. Because the specific intended application is often undetermined at the time of manufacture, the instrument must meet very rigorous specifications which, for the most part, greatly exceed normal operating conditions. In fact, when the device of FIG. 1 is subjected to severe external vibrations (i.e., in excess of 1 g over a frequency range of from 10 to 100 Hz), the output pressure of the device drops at certain frequencies to produce an unacceptable output error.

Figure 4:
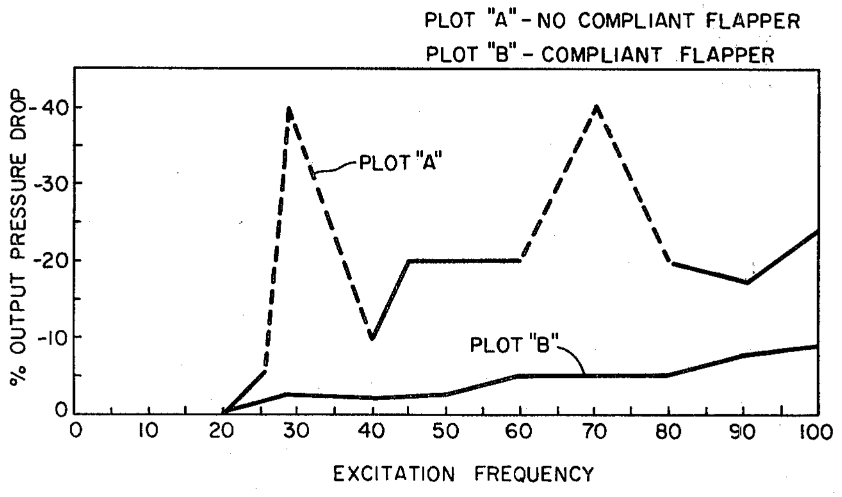
FIG. 4 is a graph of percent output pressure drop versus external excitation frequency for the instrument of FIG. 1 showing the improvement in dynamic response realized by the present invention.

When the instrument of the aforementioned copending Olsen et al application was vibration tested at 0.024 inches double amplitude from 10 to 50 Hz and then at a constant 3 g's from 50 to 100 Hz, output pressure characteristics typical of those shown in plot A of FIG. 4 were observed. Because of two primary, functionally co-operative systems of the instrument have widely varying natural frequencies (i.e., the input stage including the flapper/transducer combination having a resonance of about 17 Hz and the feedback circuit around 140 Hz), the flapper and the nozzle are subsequently induced to move at amplitudes much larger than the normal operating gap between the flapper and the nozzle (i.e., 0.001 inches) as the instrument is vibrated over the aforementioned range of frequencies. These vibration conditions result in nozzle-flapper impact, which drives the pneumatic servo system into an "open nozzle" condition, thereby producing a decrease in output pressure.

As further shown in FIG. 4, the relative displacement of nozzle and flapper in that Olsen et al device is so great at around 30 Hz and 70 Hz that the pneumatic servo is unable to respond at a fast enough rate to the nozzle-flapper impact. Thus a phasing difference occurs which results in output oscillations as indicated by the dashed lines in plot A. At the remaining external vibrational frequencies, a lesser degree of nozzle-flapper impact occurs which, while being within the overall pneumatic response of the instrument, still produces unacceptable output pressure drops.

Figure 2:
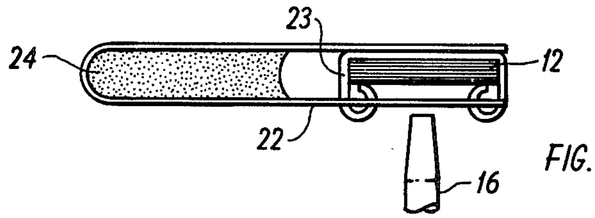
FIG. 2 is a detailed view of the nozzle-flapper unit of the instrument of FIG. 1, slightly exaggerated to show the operative relationship between the various components.
Figure 3:
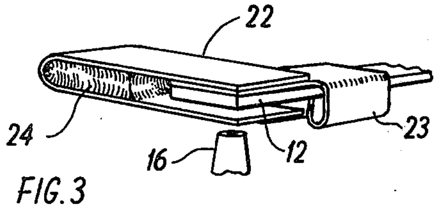
FIG. 3 is a perspective view of the nozzle-flapper unit of FIG. 2 more clearly showing the attachment of the compliant flapper to its support member.

In accordance with the present invention, a U shaped compliant flapper 22 is attached to a rotatable support member 12 which forms part of a rotary electric transducer 11 by means of a spring-loaded clip 23. The flapper covers a pneumatic control nozzle 16, which together with a feedback bellows 13, an elongated fluid duct 14 and a leaf spring assembly 15 form a pneumatic feedback circuit. This flapper-nozzle system is best illustrated in FIGS. 2 and 3. The spacing between the flapper and its support member at least in the region of the nozzle air impact is maintained at about 0.015 inches. The compliant flapper 22 is formed of a very thin, lightweight metallic ribbon of stainless steel which has a correspondingly high natural frequency, which is substantially higher than the natural frequencies of either the input stage (i.e., 17 Hz) or the feedback circuit (i.e., 140 Hz). Hence under vibrational conditions the relative displacement of the compliant flapper with respect to its support member can be significantly great within the above prescribed spacing.

When the instrument 10 is subjected to external vibrations, the nozzle 16 strikes the compliant flapper 22 which acts to "cushion" the impact; that is, the compliant flapper has an even lower spring rate than that of the input stage of the device. Thus the compliant flapper is able to move at the same amplitude of vibration as the nozzle within the prescribed spacing between the flapper and its support member 12, while exerting negligible influence on the spring rate of the input transducer 11. Furthermore, the high natural frequency of the flapper 22 allows it to rebound and then recover at a correspondingly high rate of speed, thereby tracking the nozzle and maintaining an average gap that is within the ultimate sensitivity of the nozzle-flapper system. The improvement in dynamic response afforded by the compliant flapper is clearly demonstrated by plot B of FIG. 4.

The effects of any potential self-induced vibrations resulting from the dynamics of air impinging on the light-mass flapper 22 may be minimized by inserting a small amount of silicone grease 24 between the two flappers at a point remote from the nozzle air impact region.

Although a preferred embodiment has been set forth in detail above, it is to be understood that this is solely for the purpose of illustration as it is apparent that numerous modifications of the present invention are possible. For example, changes in the design of the device that will allow it to effectively perform under different vibrational frequencies, amplitudes and "g" levels than those related in the preferred embodiment will be obvious to the skilled artisan. Additionally, although the present invention has been described for use in a particular pneumatic device in which the nozzle forms a portion of a fairly stiff, high natural frequency feedback unit, while the flapper is incorporated in a resilient, low natural frequency input stage, the principles of the present invention are equally applicable to other pneumatic instruments in which the resiliency is incorporated in the nozzle rather than flapper, i.e., a compliant member could be introduced in the nozzle system to provide a high natural frequency, low spring rate nozzle that precisely tracks a more rigid input flapper under varying external vibrational conditions. Accordingly the scope of the present invention is to be construed solely in accordance with the accompanying claims.

What is claimed is:

1. In a pneumatic control instrument of the type which produces an output signal in proportion to the deviation between a sensed condition and the desired value of said sensed condition and including a position to pneumatic transducer having a nozzle element adapted for connection to a source of fluid pressure and a flapper element acting in cooperation with said nozzle element to controllably alter the back pressure of fluid flowing through said nozzle, improved apparatus comprising:

first means for supporting said flapper element within said instrument, said first support means having a first natural resonant frequency;

second means for supporting said nozzle element within said instrument, said second support means having a second natural resonant frequency which is substantially different from said first frequency;

one of said support means including resilient means coupling its corresponding transducer element to the support means and maintaining an average gap between the other transducer element that is within the ultimate sensitivity of the nozzle/flapper system under quiescent operating conditions, said resilient means having a natural resonant frequency higher than either said first or second frequency;

said resilient means having vibratory characteristics which provide for displacement of said corresponding transducer element at substantially the same amplitude as the other of said support means, thereby maintaining said average gap under external vibration conditions.

2. Apparatus as claimed in claim 1 wherein said resilient means comprises a relatively thin, light-weight, U-shaped metallic ribbon attached to said flapper element forming a prescribed spacing therebetween.

3. Apparatus as claimed in claim 2 including means for damping self-induced vibrations resulting from fluid pressure impinging on said ribbon.

4. Apparatus as claimed in claim 3 wherein said damping means comprises a portion of silicone grease within said prescribed spacing.

5. A pneumatic control instrument comprising:

a position to pneumatic transducer assembly including a nozzle element adapted for connection to a source of fluid pressure and a flapper element covering said nozzle element to controllably alter the back pressure of fluid flowing through said nozzle;

first means for supporting said flapper element, said first means having a first resonant frequency;

second means for supporting said nozzle element, said second means having a second resonant frequency which is substantially different from said first resonant frequency;

one of the transducer elements being coupled to its corresponding support means by intermediate resilient means;

said intermediate resilient means having a third resonant frequency; said third resonant frequency being greater than either of the other two resonant frequencies;

said intermediate resilient means for maintaining a spacing between its corresponding transducer element and the coupled support means at least in the region of flapper/nozzle air impact and for moving its corresponding transducer element so as to track the other transducer element under vibration conditions which cause flapper nozzle impact.

* * * * *